(12) United States Patent
Wang et al.

(10) Patent No.: US 12,156,138 B2
(45) Date of Patent: Nov. 26, 2024

(54) METHOD FOR TRANSMITTING POWER SAVING SIGNAL, TERMINAL, AND NETWORK DEVICE

(71) Applicant: DATANG MOBILE COMMUNICATIONS EQUIPMENT CO., LTD., Beijing (CN)

(72) Inventors: Jiaqing Wang, Beijing (CN); Meiying Yang, Beijing (CN); Zheng Zhao, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 269 days.

(21) Appl. No.: 17/422,165

(22) PCT Filed: Dec. 12, 2019

(86) PCT No.: PCT/CN2019/124796
§ 371 (c)(1),
(2) Date: Jul. 9, 2021

(87) PCT Pub. No.: WO2020/143386
PCT Pub. Date: Jul. 16, 2020

(65) Prior Publication Data
US 2022/0116877 A1 Apr. 14, 2022

(30) Foreign Application Priority Data

Jan. 11, 2019 (CN) .......................... 201910025858.6

(51) Int. Cl.
*H04W 52/02* (2009.01)
(52) U.S. Cl.
CPC .............................. *H04W 52/0235* (2013.01)

(58) Field of Classification Search
CPC ......... H04W 52/0235; H04W 52/0258; H04W 52/028; H04W 52/0229; H04W 52/0219; H04W 52/0212; Y02D 30/70
See application file for complete search history.

(56) References Cited

U.S. PATENT DOCUMENTS 8,923,178 B2 12/2014 Anderson et al.
2009/0249027 A1 10/2009 Kim et al.
(Continued)

FOREIGN PATENT DOCUMENTS

| CN | 102149101 A | 8/2011 |
| CN | 102448152 A | 5/2012 |

(Continued)

OTHER PUBLICATIONS

3GPP TSG RAN WG1 Meeting #90bis; R1-1717457; Source: vivo; Title: Remaining details on wake-up signal functions for feNB-IoT, Prague, Czech Republic, Oct. 9-13, 2017. S (Year: 2017).*
(Continued)

*Primary Examiner* — Mohammed S Chowdhury
(74) *Attorney, Agent, or Firm* — Ladas & Parry, LLP

(57) ABSTRACT

A power saving signal transmission method, a terminal and a network device are provided. The method includes: receiving, by a terminal, a power saving signal transmitted by a network device; wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or, the power saving signal includes a first-stage power saving signal and a second-stage power saving signal, wherein the first-stage power saving signal and the (Continued)

second-stage power saving signal carry different power saving information respectively.

11 Claims, 4 Drawing Sheets

(56) References Cited

U.S. PATENT DOCUMENTS

| | | | |
|---|---|---|---|
| 2013/0003627 | A1 | 1/2013 | Kravtsov |
| 2013/0072241 | A1 | 3/2013 | Sorrentino |
| 2017/0265219 | A1* | 9/2017 | Wang .................... H04W 72/23 |
| 2017/0318526 | A1 | 11/2017 | Wang et al. |
| 2018/0018185 | A1* | 1/2018 | Sun ......................... G06F 21/44 |
| 2018/0084501 | A1 | 3/2018 | Mu et al. |
| 2018/0139772 | A1* | 5/2018 | Ozturk .............. H04W 52/0225 |
| 2018/0324701 | A1* | 11/2018 | Sun .................. H04W 52/0235 |
| 2020/0205218 | A1* | 6/2020 | Tang ..................... H04W 76/11 |
| 2021/0022075 | A1* | 1/2021 | Xu ....................... H04W 56/001 |
| 2021/0168715 | A1* | 6/2021 | Huang ................. H04W 24/08 |
| 2021/0274514 | A1* | 9/2021 | Li ...................... H04W 72/0453 |
| 2021/0314862 | A1* | 10/2021 | Xu ..................... H04W 52/0229 |
| 2021/0367707 | A1* | 11/2021 | Wu ..................... H04J 13/0029 |
| 2022/0039009 | A1* | 2/2022 | Iyer ........................ H04L 5/0098 |

FOREIGN PATENT DOCUMENTS

| | | |
|---|---|---|
| CN | 103347295 A | 10/2013 |
| CN | 105323830 A | 2/2016 |
| CN | 107888351 A | 4/2018 |
| CN | 110557815 A | 12/2019 |
| CN | 110972926 A | 4/2020 |
| EP | 2424290 A1 | 2/2012 |
| JP | 2014521237 A | 8/2014 |
| KR | 20100127857 A | 12/2010 |
| WO | 2019007389 A1 | 1/2019 |

OTHER PUBLICATIONS

3GPP TSG RAN WG1 Meeting #95; R1-1812773; Source: ZTE ; Title: Discussion on Wake-up signal for NB-IoT; Spokane, USA, Nov. 12-16, 2018 (Year: 2018).*
3GPP TSG-RAN WG1 #95; R1-1813046; Source: Qualcomm Incorporated; Title: Discussion on UE-group wake-up signal for NB-IoT; Spokane, USA, Nov. 12-16, 2018 (Year: 2018).*
3GPP TSG-RAN WG1 Meeting #95; R1-1812127; Source: Ericsson; Title: UE-group wake-up signal in NB-IoT, Spokane, U.S.A., Nov. 12-16, 2018 (Year: 2018).*
LG Electronics, "Discussion on power saving signal/channel function", R1-1717272, 3GPP TSG RAN WG1 Meeting 90bis, Prague, CZ, Oct. 9-13, 2017, all pages.
Sony, "Consideration of using WUS in efeMTC", R1-1804604, 3GPP TSG RAN WG1 Meeting #92bis, Sanya, China, Apr. 16-20, 2018, all pages.
Fraunhofer IIS, Fraunhofer HHI, "Group Wake-Up Signal for MTC", draft_R1-1811621, 3GPP TSG RAN WG1 Meeting #94bis, Chengdu, China, Oct. 8-12, 2018, all pages.
CATT, "Summary of Offline Discussion on Triggering Adaptation of UE Power Consumption", R1-1814328, 3GPP TSG RAN WG1 Meeting #95, Spokane, U.S.A., Nov. 12-16, 2018, all pages.
CATT, "UE Power saving schemes and power saving signal/channel", R1-1902025, 3GPP TSG RAN WG1 Meeting #96, Athens, Greece, Feb. 25-Mar. 1, 2019, all pages.
First Office Action and Search Report from CN app. No. 201910025858.6, dated Jan. 6, 2021, with English translation from Global Dossier, all pages.
First Office Action and Search Report from TW app. No. 18147357, dated Sep. 30, 2021, with machine English translation, all pages.
International Search Report from PCT/CN2019/124796, dated Mar. 16, 2020, with English translation provided by WIPO, all pages.
Written Opinion of the International Searching Authority from PCT/CN2019/124796, dated Mar. 16, 2020, with English translation provided by WIPO, all pages.
International Preliminary Report on Patentability from PCT/CN2019/124796, dated Jun. 16, 2021, with English translation provided by WIPO, all pages.
First Office Action and Search Report from TW app. No. 108147357, dated Sep. 30, 2021, with machine English translation, all pages.
First Office Action for Japanese Patent Application 2021-540303 issued on Aug. 23, 2022 and its English Translation provided by the Global Dossier.
"Updated feature lead summary on detailed design of Wake-up signal in NB-IoT," 3GPP TSG RAN WG1 Meeting #93 R1-1807561, Busan, Korea, May 21-25, 2018, Agenda Item: 6.2.7.1.1.3, Source: Huawei, HiSilicon, all pages.
"UE-group wake-up signal for NB-IoT," 3GPP TSG RAN WG1 Meeting #94, R1-1809483, Gothenburg, Sweden, Aug. 20-24, 2018, Agenda Item: 6.2.2.1, Source: Sony, all pages.
"Detection performance and correlation analysis of PDCCH-based wakeup signal," 3GPP TSG-RAN WG1 Meeting #95 R1-1813186, Spokane, USA, Nov. 12-16, 2018, Agenda Item: 7.2.9.4, Source: Ericsson, all pages.
"UE Power saving schemes with power saving signal/channel/procedures," 3GPP TSG RAN WG1 Ad-Hoc Meeting 1901, R1-1900345, Taipei, Jan. 21-25, 2019, Source: CATT, Agenda Item: 7.2.9.2.2, all pages.
First Office Action for Korean Patent Application 10-2021-7023874 issued on May 2, 2022 and its Enlish Translation provided by the Korean Patent Office.
European Search Report for European Patent Application 19 90 8638.0, issued Feb. 7, 2022.
First office action for Indian Patent Application 202127034619 issued on Mar. 28, 2022.

* cited by examiner

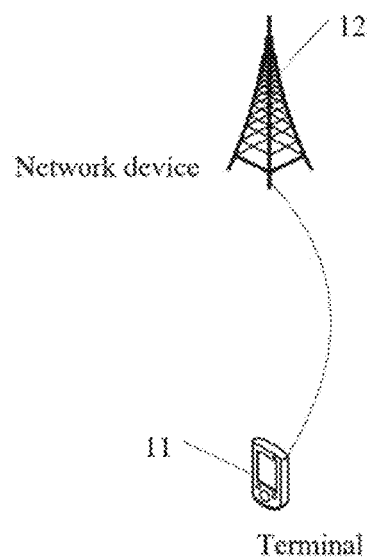
Fig.1
Receiving, by a terminal, a power saving signal transmitted by a network device — 201
Fig.2
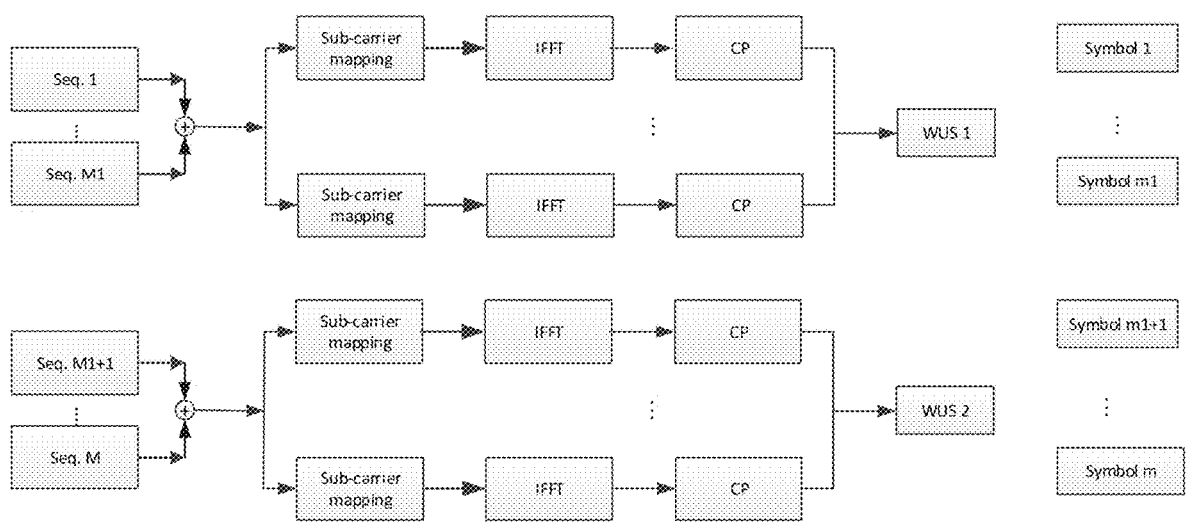
Fig.3

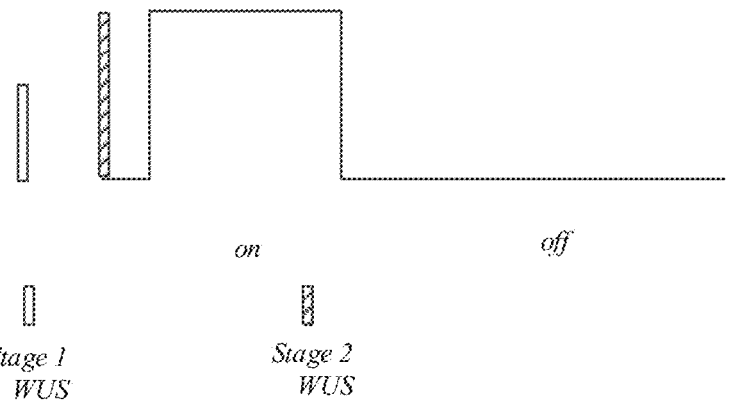
Fig.6
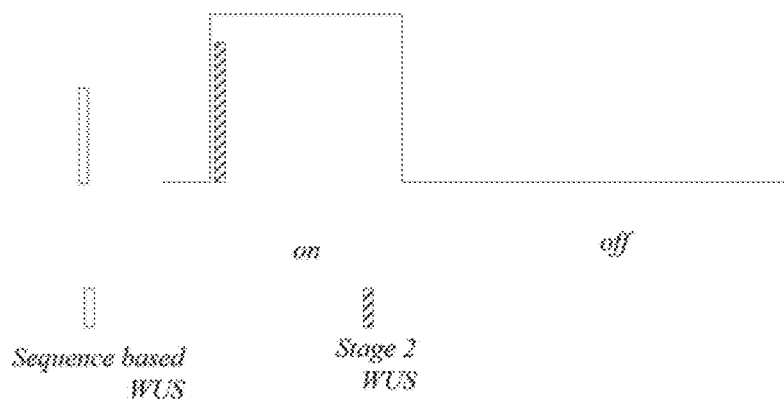
Fig.7
Transmitting, by a network device, a power saving signal to a terminal — 801
Fig.8

METHOD FOR TRANSMITTING POWER SAVING SIGNAL, TERMINAL, AND NETWORK DEVICE

CROSS REFERENCE TO RELATED APPLICATIONS

The present application is the U.S. national phase of PCT Application No. PCT/CN2019/124796 filed on Dec. 12, 2019, which claims a priority to the Chinese patent application No. 201910025858.6 filed in China on Jan. 11, 2019, the disclosures of which are hereby incorporated by reference in there entireties.

TECHNICAL FIELD

The present disclosure relates to the field of communication technologies, in particular to a power saving signal transmission method, a terminal and a network device.

BACKGROUND

In $5^{th}$ Generation (5G) New Radio (NR) systems, wider bandwidth, greater throughput, more complex services and more complex processing techniques matching the services are supported. Additionally, a terminal needs to monitor a downlink control channel in an RRC_IDLE state, an RRC_Inactive state, and an RRC_Connected state. In conventional communication systems, a monitoring position for monitoring the downlink control channel is configured in advance, and a plurality of monitoring positions are configured in advance. A terminal needs to monitor the downlink control channel at each monitoring position. For example, in a discontinuous reception (DRX) scenario, a terminal needs to monitor the downlink control channel in each on duration period. As a result, a power saving signal is introduced in NR systems. However, the conventional power saving signal cannot carry multiple pieces of power saving information, leading to poor power saving effects.

SUMMARY

Embodiments of the present disclosure provide a power saving signal transmission method, a terminal and a network device, to solve the problem of poor power saving effects.

An embodiment of the present disclosure provides a power saving signal transmission method, including:
  receiving, by a terminal, a power saving signal transmitted by a network device;
  wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
  the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
  stage indication information carried by each stage of sequence; or,
  in a case that a first-stage sequence of the multiple stages of sequences does not carry the stage indication information, stage indication information carried by remaining stages of sequences; or,
  stage indication information of one or more stages of sequences that is carried by an immediate next stage of sequence of the multiple stages of sequences.

Optionally, the stage indication information includes: stage index information or group index information.

Optionally, the multiple stages of sequences further carry at least one of:
  a bandwidth part (BWP) index, a carrier index, indication information of a quantity of to-be-skipped physical downlink control channel (PDCCH) monitoring periodicities, resource information of the power saving signal.

Optionally, the carrier index is a carrier index of at least one carrier index configured semi-statically at a network side; and/or,
  the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or,
  the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
  in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;
  wherein the base sequences of the first-stage sequence and the base sequences of the second-stage sequence are of a same sequence type, and the sequence type is orthogonal sequence, gold sequence, ZC sequence or Kasami sequence; or,
  the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;

and/or, in a case that the multiple stages of sequences include a first-stage sequence and a second-stage sequence, the terminal does not monitor the second-stage sequence until the first-stage sequence is detected;

and/or, each stage of sequence of the multiple stages of sequences has following characteristics:
one or more base sequences are summed;
the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;
the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;

and/or, the first-stage power saving signal is single stage of sequence or multiple stages of sequences;

and/or, the second-stage power saving signal is a PDCCH based power saving signal.

Optionally, a candidate position for transmitting the second-stage power saving signal in the DRX on period is configured semi-statically, or is agreed upon between the network device and the terminal in advance.

An embodiment of the present disclosure further provides a power saving signal transmission method, including:
transmitting, by a network device, a power saving signal to a terminal;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
stage indication information carried by each stage of sequence; or,
in a case that a first-stage sequence of the multiple stages of sequences do not carry the stage indication information, stage indication information carried by remaining stages of sequences; or,
stage indication information of one or more stages of sequences that is carried by an immediate next stage of sequence of the multiple stages of sequences.

Optionally, the stage indication information includes:
stage index information or group index information.

Optionally, the multiple stages of sequences further carry at least one of:
a bandwidth part (BWP) index, a carrier index, indication information of a quantity of to-be-skipped PDCCH monitoring periodicities, resource information of the power saving signal.

Optionally, the carrier index is a carrier index of at least one carrier index configured semi-statically at a network side; and/or,
the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or,
the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;
wherein the base sequences of the first-stage sequence and the base sequences of the second-stage sequence are of a same sequence type, and the sequence type is orthogonal sequence, gold sequence, ZC sequence or Kasami sequence; or,
the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
and/or,
in a case that the multiple stages of sequences include a first-stage sequence and a second-stage sequence, the terminal does not monitor the second-stage sequence until the first-stage sequence is detected;
and/or,
each stage of sequence of the multiple stages of sequences has following characteristics:
one or more base sequences are summed;
the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;
the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;
and/or,
the first-stage power saving signal is single stage of sequence or multiple stages of sequences;
and/or,
the second-stage power saving signal is a PDCCH based power saving signal.

Optionally, a candidate position for transmitting the second-stage power saving signal in the DRX on period is configured semi-statically, or is agreed upon between the network device and the terminal in advance.

An embodiment of the present disclosure further provides a terminal, including:
a reception module, configured to receive a power saving signal transmitted by a network device;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
stage indication information carried by each stage of sequence; or,
in a case that a first-stage sequence of the multiple stages of sequences does not carry the stage indication information, stage indication information carried by remaining stages of sequences; or,
stage indication information of one or more stages of sequences that is carried by an immediate next stage of sequence of the multiple stages of sequences.

Optionally, the multiple stages of sequences further carry at least one of:
a bandwidth part (BWP) index, a carrier index, indication information of a quantity of to-be-skipped PDCCH monitoring periodicities, resource information of the power saving signal.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
and/or,
in a case that the multiple stages of sequences include a first-stage sequence and a second-stage sequence, the terminal does not monitor the second-stage sequence until the first-stage sequence is detected;
and/or,
each stage of sequence of the multiple stages of sequences has following characteristics:
one or more base sequences are summed;
the sum undergoes sub-carrier mapping, inverse fast Fourier transform (IFFT) and cyclic prefix (CP) addition, and is then mapped to corresponding transmission resources.

An embodiment of the present disclosure further provides a network device, including:
a transmission module, configured to transmit a power saving signal to a terminal;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
stage indication information carried by each stage of sequence; or,
in a case that a first-stage sequence of the multiple stages of sequences does not carry the stage indication information, stage indication information carried by remaining stages of sequences; or,
stage indication information of one or more stages of sequences that is carried by an immediate next stage of sequence of the multiple stages of sequences.

Optionally, the multiple stages of sequences further carry at least one of:
  a bandwidth part (BWP) index, a carrier index, indication information of a quantity of to-be-skipped PDCCH monitoring periodicities, resource information of the power saving signal.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
  and/or,
  in a case that the multiple stages of sequences include a first-stage sequence and a second-stage sequence, the terminal does not monitor the second-stage sequence until the first-stage sequence is detected;
  and/or,
  each stage of sequence of the multiple stages of sequences has following characteristics:
  one or more base sequences are summed;
  the sum undergoes sub-carrier mapping, inverse fast Fourier transform (IFFT) and cyclic prefix (CP) addition, and is then mapped to corresponding transmission resources.

An embodiment of the present disclosure further provides a terminal, including a transceiver, a memory, a processor and a program stored in the memory and configured to be executed by the processor, wherein
  the transceiver is configured to receive a power saving signal transmitted by a network device;
  wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
  the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
  stage indication information carried by each stage of sequence; or,
  in a case that a first-stage sequence of the multiple stages of sequences does not carry the stage indication information, stage indication information carried by remaining stages of sequences; or,
  stage indication information of one or more stages of sequences that is carried by an immediate next stage of sequence of the multiple stages of sequences.

Optionally, the multiple stages of sequences further carry at least one of:
  a bandwidth part (BWP) index, a carrier index, indication information of a quantity of to-be-skipped PDCCH monitoring periodicities, resource information of the power saving signal.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
  and/or,
  in a case that the multiple stages of sequences include a first-stage sequence and a second-stage sequence, the terminal does not monitor the second-stage sequence until the first-stage sequence is detected;
  and/or,
  each stage of sequence of the multiple stages of sequences has following characteristics:
  one or more base sequences are summed;
  the sum undergoes sub-carrier mapping, inverse fast Fourier transform (IFFT) and cyclic prefix (CP) addition, and is then mapped to corresponding transmission resources.

An embodiment of the present disclosure further provides a network device, including a transceiver, a memory, a processor and a program stored in the memory and configured to be executed by the processor, wherein
  the transceiver is configured to transmit a power saving signal to a terminal;
  wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
  the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
  stage indication information carried by each stage of sequence; or,
  in a case that a first-stage sequence of the multiple stages of sequences does not carry the stage indication information, stage indication information carried by remaining stages of sequences; or,
  stage indication information of one or more stages of sequences that is carried by an immediate next stage of sequence of the multiple stages of sequences.

Optionally, the multiple stages of sequences further carry at least one of:
  a bandwidth part (BWP) index, a carrier index, indication information of a quantity of to-be-skipped PDCCH monitoring periodicities, resource information of the power saving signal.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
  and/or,
  in a case that the multiple stages of sequences include a first-stage sequence and a second-stage sequence, the terminal does not monitor the second-stage sequence until the first-stage sequence is detected;
  and/or,
  each stage of sequence of the multiple stages of sequences has following characteristics:
  one or more base sequences are summed;

the sum undergoes sub-carrier mapping, inverse fast Fourier transform (IFFT) and cyclic prefix (CP) addition, and is then mapped to corresponding transmission resources.

An embodiment of the present disclosure further provides a computer readable storage medium storing therein a computer program, wherein the computer program is configured to be executed by a processor, to implement the steps of the power saving signal transmission method of the terminal side provided by the embodiment of the present disclosure, or implement the steps of the power saving signal transmission method of the network device side provided by the embodiment of the present disclosure.

In embodiments of the present disclosure, the terminal receives the power saving signal transmitted by the network device, wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or the power saving signal includes a first-stage power saving signal and a second-stage power saving signal, wherein the first-stage power saving signal and the second-stage power saving signal carry different power saving information respectively. In this way, multiple pieces of power saving information may be carried, thus power saving effects may be improved.

BRIEF DESCRIPTION OF THE DRAWINGS

FIG. 1 is a schematic diagram of a network architecture to which embodiments of the present disclosure are applicable;

FIG. 2 is a flow diagram of a power saving signal transmission method according to an embodiment of the present disclosure;

FIG. 3 is a schematic diagram of a power saving signal according to an embodiment of the present disclosure;

FIG. 6 is a schematic diagram of another power saving signal according to an embodiment of the present disclosure;

FIG. 7 is a schematic diagram of another power saving signal according to an embodiment of the present disclosure;

FIG. 8 is a flow diagram of another power saving signal transmission method according to an embodiment of the present disclosure;

DETAILED DESCRIPTION

Figure 4:
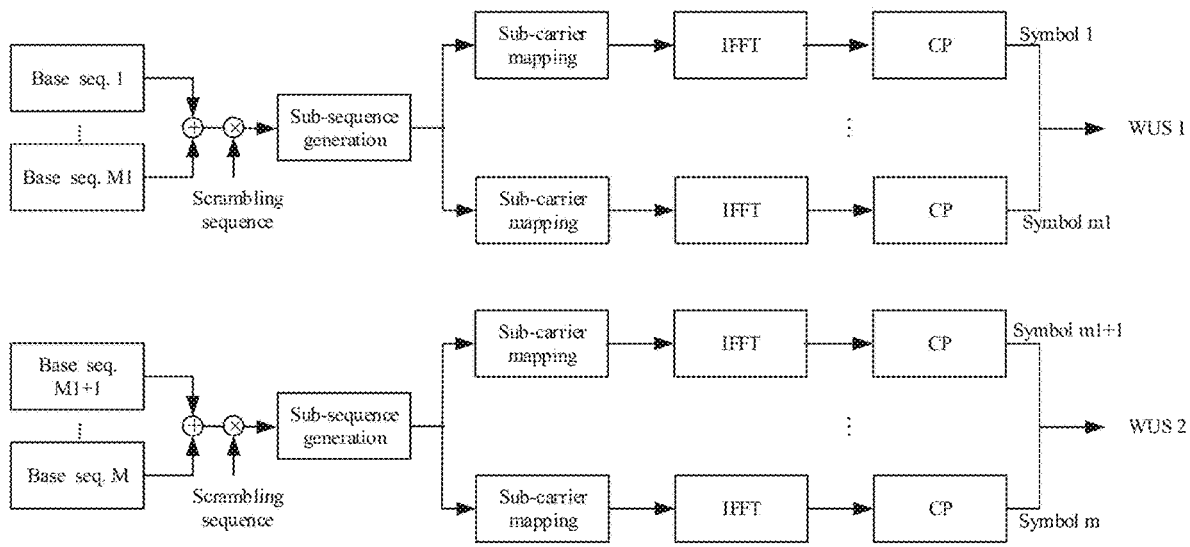
FIG. 4 is a schematic diagram of another power saving signal according to an embodiment of the present disclosure.

To describe the technical problem to be solved, the technical solutions and the advantages of the present disclosure more clearly, embodiments are described in detail hereinafter with reference to the accompanying drawings.

Referring to FIG. 1, FIG. 1 is a schematic diagram of a network architecture to which embodiments of the present disclosure are applicable. As shown in FIG. 1, the network architecture includes a terminal 11 and a network device 12. The terminal 11 may be user equipment (UE) or other terminal device, e.g., a mobile phone, tablet personal computer, laptop computer, personal digital assistant (PDA), mobile Internet device (MID), wearable device or the like. It is noted, the specific type of terminal is not limited in embodiments of the present disclosure. The network device 12 may be a base station, such as a macro station, LTE eNB, 5G NR NB; the network device may also be a small station, such as a low power node (LPN), pico or femto, or the network device may be an access point (AP); the base station may be a network node formed collectively by a central unit (CU) and multiple transmission reception points (TRPs) managed and controlled by the CU. It is noted, the specific type of network device is not limited in embodiments of the present disclosure.

Referring to FIG. 2, FIG. 2 is a flow diagram of a power saving signal transmission method according to an embodiment of the present disclosure. As shown in FIG. 2, the method includes a step 201.

201, receiving, by a terminal, a power saving signal transmitted by a network device.

The power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or, the power saving signal includes a first-stage power saving signal and a second-stage power saving signal, wherein the first-stage power saving signal and the second-stage power saving signal carry different power saving information respectively.

The power saving signal may include both a power saving signal prior to a DRX on period and a power saving signal within the DRX on period. In addition, the power saving signal may be a signal used to wake up one or more terminals, for example, the power saving signal may be a wakeup signal (WUS) or a power saving signal having a wider scope than WUS, which is not limited herein. For example, the aforementioned power saving signal may be another signal defined in a protocol, or another signal agreed upon between the network device and the terminal in advance.

The power saving identifier may be a wake up ID, and the power saving area identifier may be a wake up area ID. In addition, the power saving signal may include one or more power saving identifiers. In some implementations, one power saving identifier corresponds to one terminal, or different combinations of multiple power saving identifiers correspond to different respective terminals.

The power saving area identifier may refer to a home area identifier of the terminal corresponding to a power saving identifier, for example, it may refer to a cell ID in the RRC-Connected state, or it may refer to a track area ID or an ID of a smaller wake up area derived from dividing the track area into multiple areas in the RRC-Idle state.

The stage indication information of the multiple stages of sequences may be stage indication information of each stage of sequence, or stage indication information of some stages of the multiple stages of sequences. For example, the stage indication information is used to indicate the stage serial number/stage serial numbers of each stage or some stages of the multiple stages of sequences. The stage serial number of a received sequence may be determined from the stage indication information, thus the power waste resulting from monitoring of a second-stage sequence when a first-stage sequence is not yet received may be avoided.

In embodiments of the present disclosure, due to the power saving identifier, the power saving area identifier, and the stage indication information of the multiple stages of sequences, one or more terminals may be woken up to improve power saving effects. For example, if the terminal is in the power saving area, and the power saving ID corresponds to the terminal, the terminal may enter an awake state.

It is noted, the power saving identifier, the power saving area identifier, and the stage indication information of the multiple stages of sequences are all power saving information. That is, the multiple stages of sequences may carry at least three kinds of power saving information. The aforementioned receiving may be rephrased as monitoring.

It is further noted, in embodiments of the present disclosure, carrying may be construed as indicating, that is, the power saving signal carrying power saving information may be rephrased as the power saving signal indicating power saving information. Specifically, that the power saving signal carries power saving information may be construed as that the terminal may acquire corresponding power saving information by parsing the power saving signal.

In addition, since the power saving signal may include the first-stage power saving signal and the second-stage power saving signal, wherein the first-stage power saving signal and the second-stage power saving signal carry different power saving information respectively, the power saving signal may carry multiple kinds of power saving information as well, so as to improve power saving effects.

As an optional implementation, the stage indication information of the multiple stages of sequences includes:
  stage indication information carried by each stage of sequence; or,
  in a case that a first-stage sequence of the multiple stages of sequences does not carry the stage indication information, stage indication information carried by remaining stages of sequences; or,
  stage indication information of one or more stages of sequences that is carried by an immediate next stage of sequence of the multiple stages of sequences.

In this implementation, due to the stage indication information that may be carried by each stage of sequence, the terminal may accurately determine the stage serial number of the received sequence.

When a first-stage sequence of the multiple stages of sequences does not carry the stage indication information, and remaining stages of sequences carry stage indication information; or when stage indication information of one or more stages of sequences is carried by an immediate next stage of sequence of the multiple stages of sequences, power saving signal overhead may be reduced.

It is noted, in embodiments of the present disclosure, there is a certain order of the multiple stages of sequences, wherein the first stage of sequence is the foremost stage of the multiple stages, the second-stage sequence is a stage of sequence following the first-stage sequence, the third-stage sequence is a stage of sequence following the second-stage sequence, and so on. For example, the second-stage sequence carries the stage indication information of the first-stage sequence, and the third-stage sequence carries the stage indication information of the second-stage sequence.

Optionally, the stage indication information includes: stage index or group index information.

The aforementioned implementation is described exemplarily with two examples.

Example 1: each stage of sequence needs to carry stage indication information of the multiple stages of sequences. Taking the two stages of sequences in this embodiment for example, the initial phase of a first-stage gold sequence needs to include a 1-bit stage index, e.g., a bit of 0; the initial phase of a second-stage gold sequence also includes 1-bit initial phase information, e.g., a bit of 1. Naturally, in the case that there are more stages of sequences, the quantity of bits for indicating stage index may increase. For example, power saving information carries a maximum quantity of information bits InforNum=24, the initial phase of a first-stage gold sequence may carry wake up area ID related information (occupying 10 bits), wake up ID related information (occupying 8 bits), and the stage index of the first-stage sequence (occupying 1 bit); the initial phase of a second-stage gold sequence may carry wake up area ID related information (occupying 10 bits), the stage index of the second-stage sequence (occupying 1 bit), and wake up ID related information carried by the second-stage sequence (occupying 8 bits). The two stages of sequences support at most 256*256 wake up LDs. It is noted, the wake up ID related information carried by each sequence may be complete wake up ID information, or partial wake up ID information.

Example 2: stage indication information (e.g., group index information) carried by one or more stages of gold sequences needs to be carried by an immediate next stage of gold sequence. For example, taking the two stages of sequences for example, each specific sequence in the first-stage gold sequence carries information related to a specific wake up ID, if all possible sequences of the first-stage sequence are deemed as a group of sequences, the group of sequences may be sub-grouped to obtain S subgroups, and the index of each subgroup may be regarded as a kind of group index information. A second-stage gold sequence needs to carry the group index information of a first-stage sequence, and the information may be a function of the initial phase of the second-stage gold sequence. Since sequences of the first stage are grouped, and indexes of the subgroups are transferred to the second-stage sequence, a quantity of subgroups, namely an S value, may be 1 at minimum, and the S value may be as great as the quantity of all sequences of the stage at maximum, that is, there is only one sequence in each subgroup; the S value being 1 is equivalent to a situation where the first-stage sequence does not contain the stage index of the multiple stages of sequences, and the second-stage sequence includes a common (e.g., 1 bit) stage index of the first-stage sequence, which is a special example of the foregoing example 1 in which a sequence of each stage carries a stage index. It is obvious that the greater the S value, the less the false alarm probability of sequence monitoring is. Of course, a lesser S value is beneficial to the improvement of the multi-user multiplexing performance of a special sequence such as orthogonal sequence.

As an optional implementation, the multiple stages of sequences further carry at least one of: a BWP index, a carrier index, indication information of a quantity of to-be-skipped PDCCH monitoring periodicities, resource information of the power saving signal.

The quantity of to-be-skipped PDCCH monitoring periodicities may be denoted as N_skip, that is, the quantity of PDCCH monitoring periodicities that need to be skipped by the terminal is N_skip.

The resource information may be time or frequency information related to the resources used in transmitting the power saving signal.

In this implementation, the power saving signal may carry more power saving information, to further improve power saving effects.

Further, the carrier index may be a carrier index of at least one carrier index configured semi-statically at a network side; and/or, the quantity of to-be-skipped PDCCH monitoring periodicities is a quantity of at least one quantity of to-be-skipped PDCCH monitoring periodicities configured semi-statically at the network side.

In this implementation, the power saving signal merely needs to indicate that the carrier index is a certain carrier index among at least one carrier index configured semi-statically at a network side, thus the power saving signal overhead may be reduced. In a similar way, the power saving signal merely needs to indicate that the quantity of to-be-skipped PDCCH monitoring periodicities is a certain quantity among quantities configured at a network side, thus the power saving signal overhead may be reduced.

As an optional implementation, the multiple stages of sequences are multiple stages of sequences not scrambled by a scrambling sequence, each stage of sequence of the multiple stages of sequences is a gold sequence, and the power saving identifier, the power saving area identifier, and the stage indication information of the multiple stages of sequences are functions of initial phases of the gold sequences.

In this implementation, multiple gold sequences are cascaded to obtain the multiple stages of sequences and scrambling is not performed, thus complexity may be reduced and multiple power saving information may be carried.

In this implementation, if the power saving signal further carries other power saving information, such as BWP index or carrier index, the power saving information may be functions of initial phases of the gold sequences as well.

As an optional implementation, each stage of sequence of the multiple stages of sequences has following characteristics: one or more base sequences are summed; the sum undergoes sub-carrier mapping, inverse fast Fourier transform (IFFT) and cyclic prefix (CP) addition, and is then mapped to corresponding transmission resources.

For example, as shown in FIG. 3, a base sequence (base seq) 1 to a base sequence (base seq) M1 are summed, then the sum undergoes sub-carrier mapping, IFFT and CP addition, and is finally mapped to corresponding symbols for transmission, i.e., the first-stage sequence (e.g., WUS1) is obtained; a base sequence (base seq) M1+1 to a base sequence (base seq) M are summed, then the sum undergoes sub-carrier mapping, IFFT and CP addition, and is finally mapped to corresponding symbols for transmission, i.e., the second-stage sequence (e.g., WUS2) is obtained.

As an optional implementation, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or, the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

In this implementation, the scrambling sequence may carry the power saving area identifier and the stage indication information and the base sequence may carry the power saving identifier, thus the power saving signal may be prevented from consuming too much resource and power, to achieve the effects of saving transmission resource and power.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical, or, in the case that the stage indication information of one or more stages of sequences is carried by the scrambling sequences for the immediate next stage of sequence of the multiple stages of sequences, the scrambling sequences for respective stages of the multiple stages of sequences are different from each other.

Further, the multiple stages of sequences may at least include a first-stage sequence and a second-stage sequence;

wherein the base sequences of the first-stage sequence and the base sequences of the second-stage sequence are of a same sequence type, and the sequence type is orthogonal sequence, gold sequence, ZC sequence or Kasami sequence; or, the base sequences of the first-stage sequence may be of a sequence type selected from orthogonal sequence, gold sequence, ZC sequence or Kasami sequence, and the base sequences of the second-stage sequence may be of another sequence type selected from orthogonal sequence, gold sequence, ZC sequence or Kasami sequence.

For example, as shown in FIG. 4, a base sequence (base seq) 1 to a base sequence (base seq) M1 are summed, the sum is scrambled with a scrambling sequence (e.g., multiplied with the scrambling sequence), and then is segmented to generate at least one subsequence, subsequently the subsequences undergo sub-carrier mapping, IFFT and CP addition, and is finally mapped to corresponding symbols for transmission, i.e., the first-stage sequence (e.g., WUS1) is obtained;

a base sequence (base seq) M1+1 to a base sequence (base seq) M are summed, the sum is scrambled with a scrambling sequence (e.g., multiplied with the scrambling sequence), and then is segmented to generate at least one subsequence, subsequently the subsequences undergo sub-carrier mapping, IFFT and CP addition, and is finally mapped to corresponding symbols for transmission, i.e., the second-stage sequence (e.g., WUS2) is obtained.

In the solution as shown in FIG. 4, the scrambling sequence carries the wake up area ID and the stage indication information of the multiple stages of sequences, and the multiple stages of base sequences indicate wake up ID. Further, the scrambling sequences for respective stages are different from each other, and the scrambling sequences for multiple sequences of a same stage are identical. The base sequence preferably is an orthogonal sequence, ZC sequence, or gold sequence.

Figure 5:
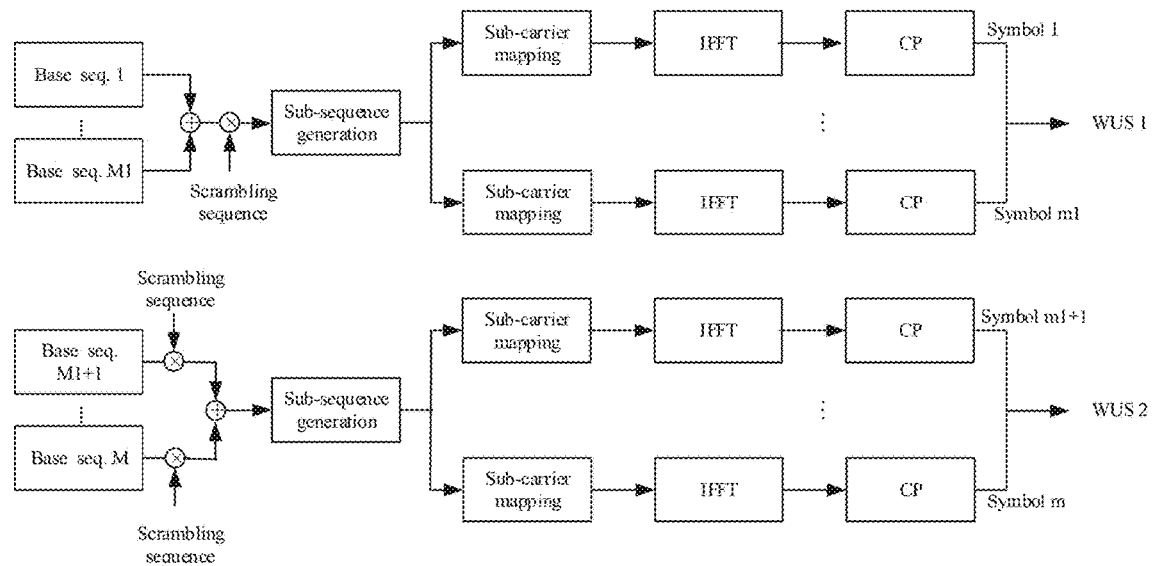
FIG. 5 is a schematic diagram of another power saving signal according to an embodiment of the present disclosure.

For another example, as shown in FIG. 5, a base sequence (base seq) 1 to a base sequence (base seq) M1 are summed, the sum is scrambled with a scrambling sequence (e.g., multiplied with the scrambling sequence), and then is segmented to generate at least one subsequence, subsequently the subsequences undergo sub-carrier mapping, IFFT and CP addition, and is finally mapped to corresponding symbols for transmission, i.e., the first-stage sequence (e.g., WUS1) is obtained;

a base sequence (base seq) M1+1 to a base sequence (base seq) M are scrambled with scrambling sequences (e.g., multiplied with the scrambling sequences) respectively and then summed, the sum is segmented to generate at least one subsequence, subsequently the subsequences undergo sub-carrier mapping, IFFT and CP addition, and is finally mapped to corresponding symbols for transmission, i.e., the second-stage sequence (e.g., WUS2) is obtained.

In the solution as shown in FIG. 5, the scrambling sequence carries the wake up area ID and the wake ID related information of previous one or more stages of sequences; and the multiple stages of base sequences indicate wake up ID. Further, the scrambling sequences for respective stages are different from each other; optionally, the scrambling sequences for multiple sequences of the first stage may be identical, and the scrambling sequences for multiple sequences of other stages are different from each other. In a scheme, sequences of each stage are gold sequences, e.g., for two stages of sequences, gold+gold; in another scheme, sequences of each stage are Hadarmad sequences (H for short), e.g., for two stages of sequences, H+H; in yet another scheme, the first-stage sequence is H, and the second-stage sequence is a gold sequence (g for short), that is, it may be represented as H+g. Of course, these are merely exemplary; specifically, a sequence to be used by respective stage according to the instruction of network device may be supported.

As an optional implementation, binary indication information composed of multiple kinds of power saving information carried by the power saving signal corresponds to sequence indexes of the multiple stages of sequences; wherein, the multiple kinds of power saving information at least comprise the power saving identifier, the power saving area identifier, and the stage indication information of the multiple stages of sequences.

That the binary indication information composed of multiple kinds of power saving information carried by the power saving signal corresponds to sequence indexes of the multiple stages of sequences may refer to that a decimal representation of the binary indication information composed of multiple kinds of power saving information carried by the power saving signal corresponds to sequence indexes of the multiple stages of sequences.

In addition, the foregoing correspondence may refer to that the sequence indexes of the multiple stages of sequences may represent the binary indication information composed of multiple kinds of power saving information carried by the power saving signal, or the foregoing correspondence may refer to that the decimal representation of the binary indication information composed of multiple kinds of power saving information carried by the power saving signal are in a one-to-one correspondence with the sequence indexes of the multiple stages of sequences.

Optionally, different fields of the sequence indexes of the multiple stages of sequences correspond to different power saving information. Thus, different power saving information may be determined from different respective fields.

A simple example is as shown in the following table:

| field 1 Wake up ID related information | field 2 BWP index information | field 3 indication information of different stages | field 3 Carrier index | field 4 N_skip |
|---|---|---|---|---|
| n1 bits | n2 bits | n3 bits | n4 bits | N5 bits |

Wherein n1+n2+n3+n4+n5 bits formed by the five fields correspond to a quantity of sequence indexes of the multiple stages of sequences: $2^{(n1+n2+n3+n4+n5)}$.

It is noted, the wake up ID related information may be used to indicate wake up ID. In addition, in embodiments of the present disclosure, the wake up ID may be indicated by multiple stages of sequences in conjunction. For example, the first-stage sequence carries partial information of the wake up ID, and the second-stage sequence carries remaining information of the wake up ID. Of course, the information may be indicated by a certain stage of sequence alone, e.g., the first-stage sequence carries all information of some wake up IDs, which is not limited herein.

It is noted, the aforementioned five-field power saving information is merely an example, power saving information including more or less information, e.g., time or frequency information related to resources used in power saving signal transmission, is not precluded. The order of the multiple fields in the table is also exemplary, and other orders of multiple fields are not precluded. For example, the wake up ID related information may be located at the most significant bit (MSB) as shown in the table, or may be located at the least significant bit (LSB).

As an optional implementation, in a case that the multiple stages of sequences include a first-stage sequence and a second-stage sequence, the terminal does not monitor the second-stage sequence until the first-stage sequence is detected.

In this implementation, since the terminal does not monitor the second-stage sequence until the first-stage sequence is detected, the power waste resulting from monitoring of the second-stage sequence when the first-stage sequence is not yet detected by the terminal may be avoided.

As an optional implementation, the first-stage power saving signal carries power saving information that does not require blind-detection; the second-stage power saving signal at least carries power saving information that is unpredictable in advance.

The power saving information that does not require blind-detection may be power saving information that can be detected by the terminal without performing blind-detection. In addition, the power saving information that does not require blind-detection may also be power saving information already known to the terminal, e.g., wake up ID, wake up area ID, indication information of the sequence stages (if there are multiple stages of sequences).

The power saving information that is unpredictable in advance may be power saving information unknown to the terminal, e.g., BWP index, carrier index, the quantity of to-be-skipped PDCCH monitoring periodicities N_skip, information of resources for transmitting the power saving signal.

In this implementation, since the first-stage power saving signal carries power saving information that does not require blind-detection, the terminal may be woken up with low power consumption. Since the second-stage power saving signal at least carries power saving information that is unpredictable in advance, the two stages of power saving signals may carry a great deal of power saving information, so as to improve power saving effects.

Optionally, the first-stage power saving signal is transmitted in a DRX OFF period, and the second-stage power saving signal is transmitted in the DRX OFF period or in a DRX on period.

In this implementation, the first-stage power saving signal may wake up the terminal in the DRX OFF period, and the second-stage power saving signal may be transmitted in the DRX OFF period or in the DRX on period, to transmit at least the power saving information that is unpredictable in advance.

For example, as shown in FIG. 6, the first-stage power saving signal is transmitted in the DRX OFF period, and the second-stage power saving signal is transmitted in the DRX OFF period. In FIG. 6, Stage 1 WUS denotes the first-stage power saving signal, and Stage 2 WUS denotes the second-stage power saving signal.

Or, as shown in FIG. 7, the first-stage power saving signal is transmitted in the DRX OFF period, and the second-stage power saving signal is transmitted in the DRX ON period. In FIG. 7, sequence based WUS denotes the first-stage power saving signal, and Stage 2 WUS denotes the second-stage power saving signal.

Optionally, a candidate position for transmitting the second-stage power saving signal in the DRX On period may be configured semi-statically, or may be agreed upon between the network device and the terminal in advance. Optionally, the second-stage power saving signal is transmitted at a starting position of the DRX ON period.

Optionally, the first-stage power saving signal is single stage of sequence or multiple stages of sequences; and/or, the second-stage power saving signal is a PDCCH based power saving signal.

The single stage of sequence or multiple stages of sequences of the first-stage power saving signal may be sequence based single stage of sequence or multiple stages of sequences, that is, the first-stage power saving signal may be referred to as a sequence based power saving signal. For the multiple stages of sequences, reference may be made to the multiple stages of sequences described with respect to aforementioned embodiments of the present disclosure, and a repeated description thereof is omitted herein.

The PDCCH power saving signal of the second-stage power saving signal may be referred to as PDCCH based power saving signal, or DCI based power saving signal.

It is noted, the multiple optional implementations provided by the embodiments of the present disclosure may be implemented separately, or implemented in combination. A power saving signal transmission method according to an embodiment of the present disclosure is described exemplarily hereinafter by assuming that the multiple stages of sequences are two stages of sequences.

Embodiment 1

FIG. 3 illustrates an example of a power saving signal based on multiple stages of sequences. For ease of description, it is assumed that the power saving signal is composed of two stages of sequences. A first-stage sequence is generated in the following manner: at base station side, frequency domain sequences: sequence 1, sequence 2, sequence 3, . . . , sequence M1 are summed, then the sum sequence undergoes IFFT and CP addition, and is then mapped to m1 OFDM symbols in the time domain, to obtain the first-stage sequence; the second-stage sequence is generated in a manner similar to that of the first-stage sequence, wherein frequency domain sequences: sequence M1+1, sequence M1+2, sequence M1+3, . . . , sequence M are summed, then the sum sequence undergoes IFFT and CP addition, and is then mapped to m-m1 OFDM symbols in the time domain, to obtain the second-stage sequence; and the two stages of sequences together form the power saving signal. Indexes of OFDM symbols in FIG. 3 have a minimal value of 1 and are consecutive, which is merely exemplary. The OFDM symbol index may start from any value meeting requirements; and the indexes of OFDM symbols may be distributed, that is, they are not consecutive. The quantity m of OFDM symbols may be equal to 1, in this case, the two stages of sequences are in fact frequency division multiplexed sequences. The two stages of sequences shown in FIG. 3 are merely a specific example given for ease of description, the same principle is applicable to three stages or more stages of sequences, all of which fall within the scope of the present disclosure. The frequency domain sequences 1, 2, . . . , M are all pseudo random sequences, e.g., commonly used m sequence and its gold sequence or Kasami sequence. As described above, considering that the power saving signal needs to carry a great deal of information, preferably the frequency domain sequences 1, 2, . . . , M are all gold sequences or Kasami sequences.

In a specific example, a gold sequence c(n) with a register length of 31 in the NR standard that is used for downlink reference signal may be utilized, the sequence c(n) is defined as follows:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

wherein, according to the definition in the standard, $N_C=1600$, the $N_C$ may be other value agreed upon in advance. In the NR standard, the first sequence $x_1(n)$ is initialized as $x_1(0)=1, x_1(n)=0, n=1, 2 \ldots, 30$. Depending on the specific usage, the second sequence $x_2(n)$ is initialized as $$c_{init} = \sum_{i=0}^{30} x_2(i) \cdot 2^i.$$

It is known from the above description that the gold sequence is in fact generated by sum two m sequences correspondingly in binary domain. For the gold sequence with the register length of 31 utilized in NR, apart from the all-zero sequence, there are $2^{31}-1$ different initial phases in total, which correspond to $2^{31}-1$ different gold sequences. Therefore, the gold sequence may carry at most 31 bits of information. Since the length of gold sequence utilized in reality cannot reach $2^{31}-1$, the quantity of carried information bits is generally less than 31, and has some relationship with the specific length of the sequence. It is assumed that the quantity of information bits carried by the gold sequence InforNum<31.

In embodiments of the present disclosure, the aforementioned multiple kinds of information that need to be indicated by a power saving signal are carried by the multiple stages of sequences. First of all, the UE specific power saving signal must carry wake up area ID and wake up ID related information (which may also be referred to as wake up ID), so as to avoid mistakenly waking up wake up ID corresponding to other stages of sequences on the same resource. For example, if a first-stage sequence of two stages of sequences of a user 1 and a second-stage sequence of two stages of sequences of a user 2 are transmitted simultaneously in a time slot 1, the user 1 may mistakenly detect the sequence of the user 2 as its own. It is mandatory that the multiple stages of sequence carry indication information for distinguishing between different stages of the multiple stages of sequences. Specific schemes are as follows.

Scheme 1: each stage of sequence needs to carry the stage indication information of the multiple stages of sequences. Taking the two stages of sequences in this embodiment for example, the initial phase of the first-stage gold sequence needs to include one bit of stage index information, e.g., a bit of 0, the initial phase of a second-stage gold sequence also includes 1-bit initial phase information, e.g., a bit of 1. Naturally, in the case that there are more stages of sequences, the quantity of bits for indicating stage index may increase. More specifically, for example, power saving information carries a maximum quantity of information bits InforNum=24, the initial phase of the first-stage gold sequence may carry wake up area ID related information (which may also be referred to as wake up area ID) occupying 10 bits, wake up ID related information occupying 8 bits, and the stage index of the first-stage sequence (occupying 1 bit); the initial phase of the second-stage gold sequence may carry wake up area ID related information (occupying 10 bits), the stage index of the second-stage sequence (occupying 1 bit), and wake up ID related information carried by the second-stage sequence (occupying 8 bits). The two stages of sequences support at most 256*256 wake up IDs. It is noted, the wake up ID related information carried by each sequence may be complete wake up ID information, or partial wake up ID information.

Scheme 2: wake up ID related information carried by one or more stages of gold sequences needs to be carried by an immediate next stage of gold sequence. For example, taking the two stages of sequences for example, each specific sequence in the first-stage gold sequence carries information related to a specific wake up ID, if all possible sequences of the first-stage sequence are deemed as a group of sequences, the group of sequences may be sub-grouped to obtain S subgroups, and the index (i.e., group index) of each subgroup may be regarded as a kind of wake up ID related information. A second-stage gold sequence needs to carry the wake up ID related information (e.g., group index) of the first-stage sequence, and the information may be a function of the initial phase of the second-stage gold sequence. Since sequences of the first stage are grouped, and indexes of the subgroups are transferred to the second-stage sequence, a quantity S of subgroups may be 1 at minimum, and the S value may be as great as the quantity of all sequences of the stage at maximum, that is, there is only one sequence in each subgroup; the S value being 1 is equivalent to a situation where the first-stage sequence does not contain the stage index of the multiple stages of sequences, and the second-stage sequence includes a common (e.g., 1 bit) stage index of the first-stage sequence, which is a special example of the scheme 1 in which a sequence of each stage carries a stage index. It is obvious that the greater the S value, the less the false alarm probability of sequence monitoring is. Of course, a lesser S value is beneficial to the improvement of the multi-user multiplexing performance of a special sequence such as orthogonal sequence.

In addition to the wake up area ID, the wake up ID, and the stage indication information, the multiple stages of sequences may carry one or more of a BWP index, carrier index, or time or frequency information related to the resource for transmitting the power saving signal. For example, still assuming InforNum=24, the initial phase of the first-stage (gold) sequence may carry wake up area ID (occupying 10 bits), wake up ID related information (occupying 7 bits), stage indication information (1 bit), BWP index related information (occupying 2 bits), and carrier index related information (occupying 4 bits); the second-stage sequence carries wake up area ID (occupying 10 bits), wake up ID related information (occupying 9 bits), and stage indication information (1 bit). The two stages of sequences support a total of $2^{16}$ wake up IDs, thus 15 carriers may be activated, switching may be performed among 4 BWPs, and four types of possible PDCCH monitoring periodicities may be skipped.

The terminal monitors the second-stage sequence only when the first-stage sequence is detected; and if the monitoring of the first-stage sequence fails, the monitoring of the second-stage sequence is forgone. As soon as the first-stage sequence is detected, the terminal performs a wake up process, that is, PDCCH monitoring is performed in a subsequent DRX ON period, to reduce the probability of missing monitoring.

The multiple stages of sequences in the above example are preferably acquired based on a gold sequence, however, other PN sequence, such as Kasami sequence which has a performance very close to the gold sequence, is not precluded. Of course, it may be that the multiple stages of sequences adopt different sequences respectively, e.g., one stage of sequence adopts gold sequence, and another stage of sequence adopts Kasami sequence.

Embodiment 2

For the multiple stages of sequences in the embodiment 1, since the input parameter of gold sequence or Kasami sequence may carry multiple bits, each stage of sequence may be acquired based on gold sequence or Kasami sequence. However, when many UEs are multiplexed on the same resource, the performance of the gold sequence or Kasami sequence deteriorates as the inter-UE interference increases. Thus, the power saving signal may be based on orthogonal sequence. Moreover, the sequence without scrambling is only applicable when the register for the gold sequence is very long. How to support the multiple stages of sequences carrying multiple types of information when a scrambling sequence is utilized is described hereinafter.

The two-stage power saving sequence is also taken for example.

Scheme 1: as shown in FIG. 4, the two stages of WUS sequences form one power saving signal and are generated according to the same principle. Each stage of WUS is generated in the following manner: firstly, frequency domain base sequences are summed, then the sum sequence is scrambled, undergoes an operation such as IFFT, and is mapped to m time domain symbols, where m may be equal to 1, at this time the multiple stages of sequences are cascaded in frequency domain. The multiple stages of base sequences correspond to wake up ID information, and the scrambling sequence corresponds to wake up area ID information. Preferably, a base sequence may be cyclic shifted sequence of orthogonal sequence such as Hadamard/wash sequence/ZC sequence, and the scrambling sequence is gold sequence, e.g., the gold sequence of the $31^{st}$ order register utilized in NR in the embodiment 1. For example, the first-stage WUS supports at most M1=256 sequences, the second-stage WUS also supports at most M1=256 sequences, then M1*M1 sequences may be generated by cascading the two stages of WUS sequences. The M1*M1 sequences in the same wake up area use the same scrambling sequence to correspond to the wake up area ID information. In addition to the wake up area ID, the scrambling sequence for the power saving signal also needs to carry indication information of respective stage of the multiple stages of sequences. The scrambling sequence is at least a function of the wake up area ID and indication information of respective stage of the multiple stages of sequences, and the scrambling sequences for respective stages of the multiple stages of sequences are different from each other.

Scheme 2: as shown in FIG. 5, the two stages of WUS sequences form one power saving signal and are generated in the following manner. The first-stage sequence is generated in the following manner: frequency domain base sequence 1, base sequence 2, base sequence 3, . . . , base sequence M1 are summed, the sum sequence is scrambled with one common scrambling sequence, and then undergoes sub-carrier mapping IFFT and CP addition to be mapped to m1 OFDM symbols in the time domain, to obtain the first-stage sequence; the second-stage sequence is generated in a manner different from that of the first-stage sequence, specifically, each frequency domain base sequence undergoes a separate scrambling operation, wherein the scrambling sequence is related to the group index of the groups of the first-stage sequence, then the M-M1 scrambled sequences are summed, wherein the scrambling operations of the base sequences of the second-stage sequence are independent of each other, and subsequently the sum sequence undergoes sub-carrier mapping IFFT and CP addition to be mapped to m-m1 OFDM symbols in the time domain. It is noted, m1 may be equal to 1, at this time the multiple stages of sequences are frequency division multiplexed.

The power saving signal of the above structure must carry wake up area ID and wake up ID, and wake up ID related information (e.g., group index information) of one or more stages of sequences needs to be carried by an immediate next stage of sequence. The definition of the wake up ID related information of the one or more stages of sequences is similar to the relevant description in the scheme 2 of the embodiment 1. If all possible sequences of the first-stage sequence are deemed as a group of sequences, the group of sequences may be sub-grouped to obtain S subgroups, and the index of each subgroup may be regarded as a kind of wake up ID related information. According to the present disclosure, possible sequences of a stage of sequence are grouped, and indexes of the subgroups are transferred to a next stage of sequence, that is, the scrambling sequence for the second-stage sequence carries group index of the first-stage sequence, a quantity S of subgroups may be 1 at minimum, and the S value may be as great as the quantity of all sequences of the stage at maximum, that is, there is only one sequence in each subgroup; the S value being 1 is equivalent to a situation where the scrambling sequence for the first-stage sequence does not contain the stage index of the multiple stages of sequences, and the scrambling sequence for the second-stage sequence includes a common (e.g., 1 bit) stage index, which is a special example of the scheme 1. It is obvious that the greater the S value, the less the false alarm probability of sequence monitoring is, while a lesser S value is beneficial to the improvement of the multi-user multiplexing performance of a special sequence such as orthogonal sequence.

In the above description, the sequence combination formed by two stages of base sequences corresponds to wake up ID information, and wake up area ID information is carried by the scrambling sequence. The first-stage sequence carries wake up area ID information by using one common scrambling sequence, while the scrambling sequence for the second-stage sequence carries, in addition to the wake up area ID information, group index information of a previous stage of sequence. Preferably, the so-called carrying refers to that the to-be-carried information is a function of the scrambling sequence. The base sequence may be cyclic shifted sequence of orthogonal sequence such as Hadamard/wash sequence/ZC sequence, gold sequence, ZC sequence with a different root or the like, and preferably the scrambling sequence is gold sequence, e.g., the gold sequence of the $31^{st}$ order register utilized in NR in the embodiment 1.

More specific schemes are as follows.

Scheme 1: the base sequences of the first-stage sequence and the base sequences of the second stage are all gold sequences or Kasami sequences, while the scrambling sequence is still a long gold sequence, e.g., the gold sequence c(n) with a register length of 31 as described above. More specifically, the base sequences of the first stage and the base sequences of the second stage are SSS sequences in NR. The SSS sequence has 1008 sequences, thus two stages of SSS sequences have 1008*1008=1016064 sequence combinations, can support a maximum of 1016064 users and carry nearly 20 bits of information. Since the two stages of sequences are SSS+SSS, the UE may utilize the SSS sequences to perform time-frequency synchronization. It is noted, as the SSS sequence is scrambled, the SSS sequence will not be confused with the legacy SSB (synchronization signal block). Since both stages of sequences are gold sequences, this scheme has the advantage of supporting many users, and the disadvantage of serious performance loss when multiple sequences are summed if the amount of users is exceptionally large.

Scheme 2: the base sequences of the first-stage sequence and the base sequences of the second stage are all orthogonal sequences or ZC sequences, while the scrambling sequence is still a long gold sequence, e.g., the gold sequence c(n) with a register length of 31 as described above. More specifically, for example, the base sequences of the first stage are Hadarmad sequences, and the base sequences of the second stage are also Hadarmad sequences. Assuming a single stage of sequence is 128 in length, two stages of SSS sequences have 128*128 sequence combinations. Thus, the supported user quantity is much less than SSS+SSS, however the first-stage sequence of this scheme is an orthogonal sequence, and since the subgroups of the second-stage sequence.

Scheme 3: the base sequences of the first-stage sequence are all orthogonal sequences or ZC sequences, and the base sequences of the second stage are all gold sequences or Kasami sequences, while the scrambling sequence is still a long gold sequence, e.g., the gold sequence c(n) with a register length of 31 as described above. More specifically, the base sequences of the first stage are Hadarmad or ZC sequences, and the base sequences of the second stage are gold sequences such as SSS sequences. Assuming a single stage of sequence is 128 in length, two stages of SSS sequences have 128*1008 sequence combinations. Thus, the supported user quantity is greater than a case in which both stages of sequences are orthogonal sequences, and less than a case in which both stages of sequences are gold sequences. But the performance is superior to the case in which both stages of sequences are gold sequences and is similar to the case in which both stages of sequences are orthogonal sequences. Assuming the sequences of the first stage are orthogonal sequences such as Hadarmad sequences, and the sequences of the second stage are gold sequences such as SSS sequences, an additional advantage lies in that the base station may configure the quantity of stages of the power saving signal according to an application scenario. For example, in a scenario with less users, it can be configured that only sequences of the first stage are all orthogonal sequences, thereby greatly improving the performance of summation when multiple users are present; on the contrary, if there are many users, sequences of two stages may be configured as orthogonal sequences. The base station performs following action: indicating the stage index of used power saving signal through semi-static signaling carried by RRC or system information, certainly, dynamic signaling such as DCI or MAC CE may also be used.

In addition to wake up area ID, wake up ID, and wake up ID of previous one or more stages of sequences, the power saving signal sometimes needs to carry other power saving information, in this case, the following scheme can be adopted.

The binary indication information (decimal representation) composed of multiple kinds of power saving information carried by the power saving signal are in a one-to-one correspondence with the sequence indexes of the multiple stages of sequences. A simple example is as shown in the following table:

| field 1<br>Wake up ID<br>related<br>information | field 2<br>BWP index<br>information | field 3<br>indication<br>information of<br>different stages | field 3<br>Carrier<br>index | field 4<br>N_skip |
|---|---|---|---|---|
| n1 bits | n2 bits | n3 bits | n4 bits | N5 bits |

Wherein n1+n2+n3+n4+n5 bits formed by the five fields correspond to a quantity of sequence indexes of the multiple stages of sequences: $2^{(n1+n2+n3+n4+n5)}$.

It is noted, the aforementioned four-field power saving information is merely an example, power saving information including more or less information, e.g., time or frequency information related to resources used in power saving signal transmission, is not precluded. The order of the multiple fields in the table is also exemplary, and other orders of multiple fields are not precluded. For example, the wake up ID related information may be located at the MSB as shown in the table, or may be located at the LSB.

The above scheme can address the problem of how sequence combinations included in the multiple stages of sequences can carry power saving information. As described above, the scrambling sequence at least carries wake up area ID information, but it is noted, when the scrambling sequence is gold or Kasami sequence, the initial phase of the scrambling sequence may carry other power saving information, besides the mandatory wake up area ID information. For example, the initial phase of the gold sequence may be a function of wake up ID related information and BWP index, in this way, as the BWP index is carried by the scrambling sequence, the N_MS=M1*M1 sequences may carry more additional information, e.g., more wake up ID information, or more information of quantity of to-be-skipped PDCCH monitoring periodicities. The scrambling sequence may also be a function of time or frequency information of resources where the power saving signal is located, for example, the initial phase is related to the slot index of the starting point of power saving signal transmission, or related to the index configured for the transmission frequency of the power saving signal, e.g., the power saving information may be input to the initial phase.

The terminal may perform following actions: the wake up area is known to the terminal, the terminal first receives the power saving signal on the corresponding position, the terminal performs a descrambling operation and detects a correlation between the descrambled received signal and corresponding base sequences known to the terminal, to determine whether there is a corresponding power saving signal on the resource. It is noted, for power saving information that cannot be known in advance, e.g., the BWP index is unknown without a priori information, the terminal needs to perform blind-detection or hypothesis testing according to possible values of the BWP index. If the terminal detects the corresponding power saving signal, then the terminal awakes and performs PDCCH monitoring in the subsequent DRX ON period, otherwise, the terminal continues sleeping.

Embodiment 3

According to the methods described in embodiments 1 and 2, the power saving signal may carry multiple kinds of power saving information in addition to the wake up area ID and wake up ID. However, if the carried information is unknown, e.g., BWP index information, the terminal needs to perform blind-detection or hypothesis testing of the BWP index. This will undoubtedly increase the monitoring power consumption of the UE. Another method is as follows.

The network device first transmits in the DRX OFF period a sequence-based power saving signal, e.g., the multiple stages of sequences as shown in embodiments 1 and 2, or one stage of sequence (i.e., single stage of sequence) among multiple stages of sequences which are based on orthogonal sequences as described in embodiment 2. The sequence based power saving signal preferably only carries power saving information not requiring blind-detection, such as wake up ID, wake up area ID, stage indication information of the multiple stages of sequences (if multiple stages of sequences are utilized), and known information related to a power saving channel. If the network device transmits a first-stage power saving signal for waking up a certain wake up ID, the base station transmits a PDCCH based power saving signal in the DRX OFF period to the wake up ID, that is, transmits a PDCCH in the DRX OFF period, wherein the DCI of the PDCCH carries the aforementioned power saving information that cannot be predicted in advance, e.g., BWP index, as shown in FIG. 6. The frequency domain position for transmitting the PDCCH based power saving signal may be the same as that of the sequence based power saving signal, and preferably may be the same as the frequency domain resource configured by PDCCH in the DRX ON period.

FIG. 7 illustrates an example in which the second-stage DCI based power saving signal is transmitted in the DRX ON period. Like FIG. 6, the first-stage sequence based power saving signal is transmitted in the DRX OFF period for waking up the terminal. A PDCCH based power saving signal carrying multiple kinds of aforementioned power saving information is transmitted in the DRX ON period, and is preferably transmitted at the initial stage of the DRX ON period, e.g., is transmitted in the first L slots of the DRX ON period (e.g., L is less than or equal to a determined value such as 8). Since the PDCCH based power saving signal is in the DRX ON period, to avoid blind-detection of PDCCH, one or more candidate transmission positions for transmitting a second-stage PDCCH based power saving signal may be predetermined or configured semi-statically by the base station through RRC signaling. UE monitors the second-stage PDCCH based power saving signal in the corresponding position. The second-stage PDCCH based power saving signal differs from the PDCCH in the related art in that the second-stage PDCCH based power saving signal carries a specially defined DCI for carrying power saving information.

In the embodiments of the present disclosure, the terminal receives the power saving signal transmitted by the network device, wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or the power saving signal includes a first-stage power saving signal and a second-stage power saving signal, wherein the first-stage power saving signal and the second-stage power saving signal carry different power saving information respectively. In this way, multiple pieces of power saving information may be carried, thus power saving effects may be improved.

Referring to FIG. 8, FIG. 8 is a flow diagram of another power saving signal transmission method according to an embodiment of the present disclosure. As shown in FIG. 8, the method includes following step:

801, transmitting, by a network device, a power saving signal to a terminal;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
stage indication information carried by each stage of sequence; or,
in a case that a first-stage sequence of the multiple stages of sequences do not carry the stage indication information, stage indication information carried by remaining stages of sequences; or,
stage indication information of one or more stages of sequences that is carried by an immediate next stage of sequence of the multiple stages of sequences.

Optionally, the stage indication information includes:
stage index information or group index information.

Optionally, the multiple stages of sequences further carry at least one of:
a BWP index, a carrier index, indication information of a quantity of to-be-skipped PDCCH monitoring periodicities, resource information of the power saving signal.

Optionally, the carrier index is a carrier index of at least one carrier index configured semi-statically at a network side; and/or,
the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or,
the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;
wherein the base sequences of the first-stage sequence and the base sequences of the second-stage sequence are of a same sequence type, and the sequence type is orthogonal sequence, gold sequence, ZC sequence or Kasami sequence; or,
the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences; and/or,
in a case that the multiple stages of sequences include a first-stage sequence and a second-stage sequence, the terminal does not monitor the second-stage sequence until the first-stage sequence is detected;
and/or,
each stage of sequence of the multiple stages of sequences has following characteristics:
one or more base sequences are summed;

the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;
the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;
and/or,
the first-stage power saving signal is single stage of sequence or multiple stages of sequences;
and/or,
the second-stage power saving signal is a PDCCH based power saving signal.

Optionally, a candidate position for transmitting the second-stage power saving signal in the DRX on period is configured semi-statically, or is agreed upon between the network device and the terminal in advance.

It is noted, this embodiment is an implementation on the network device and corresponds to the embodiment as shown in FIG. 2; for a specific implementation of this embodiment, a reference may be made to relevant description of the embodiment as shown in FIG. 2. To avoid repetition, a detailed description thereof is omitted in this embodiment, and this embodiment may achieve the same beneficial effects.

Figure 9:
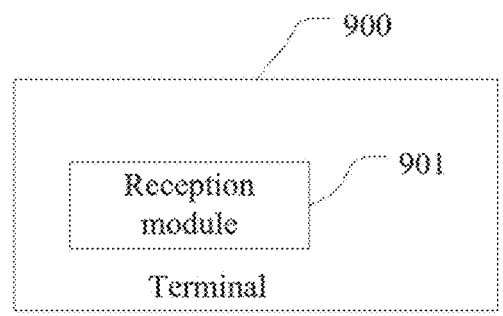
FIG. 9 is a structural diagram of a terminal according to an embodiment of the present disclosure.

Referring to FIG. 9, FIG. 9 is a structural diagram of a terminal according to an embodiment of the present disclosure. As shown in FIG. 9, the terminal 900 includes:
a reception module 901, configured to receive a power saving signal transmitted by a network device;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
stage indication information carried by each stage of sequence; or,
in a case that a first-stage sequence of the multiple stages of sequences do not carry the stage indication information, stage indication information carried by remaining stages of sequences; or,
stage indication information of one or more stages of sequences that is carried by an immediate next stage of sequence of the multiple stages of sequences.

Optionally, the stage indication information includes:
stage index information or group index information.

Optionally, the multiple stages of sequences further carry at least one of:
a BWP index, a carrier index, indication information of a quantity of to-be-skipped PDCCH monitoring periodicities, resource information of the power saving signal.

Optionally, the carrier index is a carrier index of at least one carrier index configured semi-statically at a network side; and/or,
the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or,
the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;
wherein the base sequences of the first-stage sequence and the base sequences of the second-stage sequence are of a same sequence type, and the sequence type is orthogonal sequence, gold sequence, ZC sequence or Kasami sequence; or,
the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
and/or,
in a case that the multiple stages of sequences include a first-stage sequence and a second-stage sequence, the terminal does not monitor the second-stage sequence until the first-stage sequence is detected;
and/or,
each stage of sequence of the multiple stages of sequences has following characteristics:
one or more base sequences are summed;
the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;
the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;
and/or,
the first-stage power saving signal is single stage of sequence or multiple stages of sequences;
and/or,
the second-stage power saving signal is a PDCCH based power saving signal.

Optionally, a candidate position for transmitting the second-stage power saving signal in the DRX on period is configured semi-statically, or is agreed upon between the network device and the terminal in advance.

It is noted, the terminal 900 in this embodiment may be a terminal of any implementation in the method embodiment of the embodiments of the present disclosure. Any implementation of the terminal in the method embodiment of the embodiments of the present disclosure may be implemented by the terminal 900 in this embodiment and may achieve the same beneficial effects. A detailed description thereof is omitted.

Figure 10:
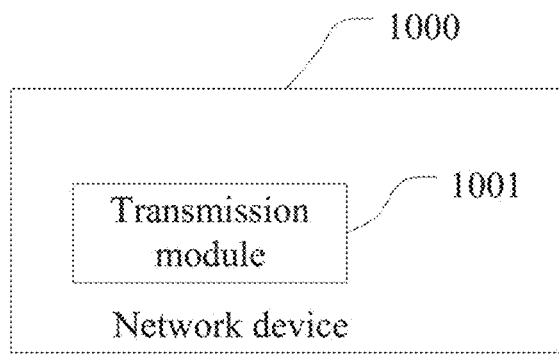
FIG. 10 is a structural diagram of a network device according to an embodiment of the present disclosure.

Referring to FIG. 10, FIG. 10 is a structural diagram of a network device according to an embodiment of the present disclosure. As shown in FIG. 10, the network device 1000 includes:
a transmission module 1001, configured to transmit a power saving signal to a terminal;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

Optionally, the stage indication information of the multiple stages of sequences includes:
stage indication information carried by each stage of sequence; or,
in a case that a first-stage sequence of the multiple stages of sequences do not carry the stage indication information, stage indication information carried by remaining stages of sequences; or,
stage indication information of one or more stages of sequences that is carried by an immediate next stage of sequence of the multiple stages of sequences.

Optionally, the stage indication information includes:
stage index information or group index information.

Optionally, the multiple stages of sequences further carry at least one of:
a BWP index, a carrier index, indication information of a quantity of to-be-skipped PDCCH monitoring periodicities, resource information of the power saving signal.

Optionally, the carrier index is a carrier index of at least one carrier index configured semi-statically at a network side; and/or,
the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or,
the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;
wherein the base sequences of the first-stage sequence and the base sequences of the second-stage sequence are of a same sequence type, and the sequence type is orthogonal sequence, gold sequence, ZC sequence or Kasami sequence; or, the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
and/or,
in a case that the multiple stages of sequences include a first-stage sequence and a second-stage sequence, the terminal does not monitor the second-stage sequence until the first-stage sequence is detected;
and/or,
each stage of sequence of the multiple stages of sequences has following characteristics:
one or more base sequences are summed;
the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;
the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;
and/or,
the first-stage power saving signal is single stage of sequence or multiple stages of sequences;
and/or,
the second-stage power saving signal is a PDCCH based power saving signal.

Optionally, a candidate position for transmitting the second-stage power saving signal in the DRX on period is configured semi-statically, or is agreed upon between the network device and the terminal in advance.

It is noted, the network device 1000 in this embodiment may be a terminal of any implementation in the method embodiment of the embodiments of the present disclosure. Any implementation of the network device in the method embodiment of the embodiments of the present disclosure may be implemented by the network device 1000 in this embodiment and may achieve the same beneficial effects. A detailed description thereof is omitted.

Figure 11:
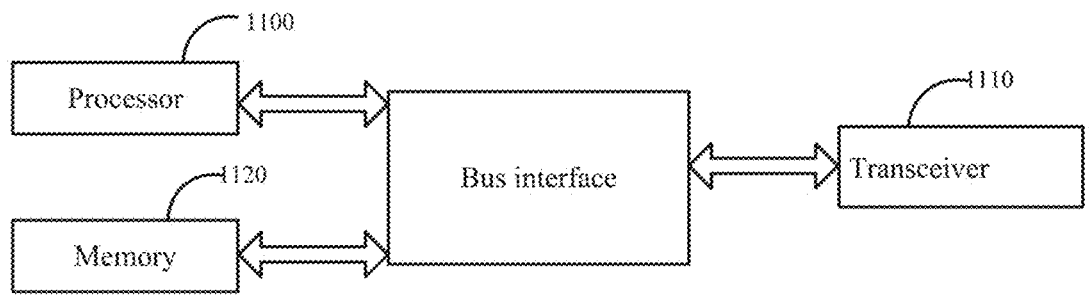
FIG. 11 is a structural diagram of another terminal according to an embodiment of the present disclosure.

Referring to FIG. 11, FIG. 11 is a structural diagram of another terminal according to an embodiment of the present disclosure. As shown in FIG. 11, the terminal includes: a transceiver 1110, a memory 1120, a processor 1100 and a program stored in the memory 1120 and configured to be executed by the processor 1100, wherein
the transceiver 1110 is configured to receive a power saving signal transmitted by a network device;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or,
the power saving signal includes a first-stage power saving signal and a second-stage power saving signal, wherein the first-stage power saving signal and the second-stage power saving signal carry different power saving information respectively.

The transceiver 1110 may be used to receive and transmit data under the control of the processor 1100.

In FIG. 11, a bus architecture may include any number of interconnected buses and bridges, and connects various circuits including one or more processors represented by the processor 1100 and memory represented by the memory 1120. The bus architecture may also connect various other circuits such as peripherals, voltage regulators and power management circuits, which is well known in the art. Therefore, a detailed description thereof is omitted herein. A bus interface provides interfaces. The transceiver 1110 may be multiple elements, i.e., including a transmitter and a receiver, to allow for communication with various other apparatuses on the transmission medium.

The processor 1100 is responsible for supervising the bus architecture and normal operation and the memory 1120 stores the data being used by the processor 1100 during operation.

It is noted, the memory 1120 is not limited to be on the terminal only, and the memory 1120 and the processor 1100 may be located separately in different geographic positions.

Optionally, the stage indication information of the multiple stages of sequences includes:
stage indication information carried by each stage of sequence; or,
in a case that a first-stage sequence of the multiple stages of sequences do not carry the stage indication information, stage indication information carried by remaining stages of sequences; or,
stage indication information of one or more stages of sequences that is carried by an immediate next stage of sequence of the multiple stages of sequences.

Optionally, the stage indication information includes:
stage index information or group index information.

Optionally, the multiple stages of sequences further carry at least one of:
a BWP index, a carrier index, indication information of a quantity of to-be-skipped PDCCH monitoring periodicities, resource information of the power saving signal.

Optionally, the carrier index is a carrier index of at least one carrier index configured semi-statically at a network side; and/or,
the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or, the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical, or, in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;

wherein the base sequences of the first-stage sequence and the base sequences of the second-stage sequence are of a same sequence type, and the sequence type is orthogonal sequence, gold sequence, ZC sequence or Kasami sequence; or, the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;

and/or, in a case that the multiple stages of sequences include a first-stage sequence and a second-stage sequence, the terminal does not monitor the second-stage sequence until the first-stage sequence is detected;

and/or, each stage of sequence of the multiple stages of sequences has following characteristics:

one or more base sequences are summed;

the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;

the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;

and/or, the first-stage power saving signal is single stage of sequence or multiple stages of sequences;

and/or, the second-stage power saving signal is a PDCCH based power saving signal.

Optionally, a candidate position for transmitting the second-stage power saving signal in the DRX on period is configured semi-statically, or is agreed upon between the network device and the terminal in advance.

It is noted, the terminal in this embodiment may be a terminal of any implementation in the method embodiment of the embodiments of the present disclosure. Any implementation of the terminal in the method embodiment of the embodiments of the present disclosure may be implemented by the terminal in this embodiment and may achieve the same beneficial effects. A detailed description thereof is omitted.

Figure 12:
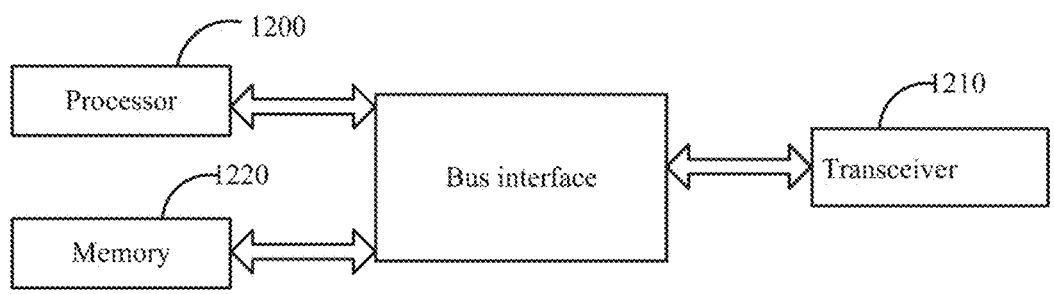
FIG. 12 is a structural diagram of another network device according to an embodiment of the present disclosure.

Referring to FIG. 12, FIG. 12 is a structural diagram of another network device according to an embodiment of the present disclosure. As shown in FIG. 12, the network device includes: a transceiver 1210, a memory 1220, a processor 1200 and a program stored in the memory 1220 and configured to be executed by the processor, wherein the transceiver 1210 is configured to transmit a power saving signal to a terminal;

wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; or, the power saving signal includes a first-stage power saving signal and a second-stage power saving signal, wherein the first-stage power saving signal and the second-stage power saving signal carry different power saving information respectively.

The transceiver 1210 may be used to receive and transmit data under the control of the processor 1200.

In FIG. 12, a bus architecture may include any number of interconnected buses and bridges, and connects various circuits including one or more processors represented by the processor 1200 and memory represented by the memory 1220. The bus architecture may also connect various other circuits such as peripherals, voltage regulators and power management circuits, which is well known in the art. Therefore, a detailed description thereof is omitted herein. A bus interface provides interfaces. The transceiver 1210 may be multiple elements, i.e., including a transmitter and a receiver, to allow for communication with various other apparatuses on the transmission medium.

The processor 1200 is responsible for supervising the bus architecture and normal operation and the memory 1220 stores the data being used by the processor 1200 during operation.

It is noted, the memory 1220 is not limited to be on the network device only, and the memory 1120 and the processor 1100 may be located separately in different geographic positions.

Optionally, the stage indication information of the multiple stages of sequences includes:
stage indication information carried by each stage of sequence; or,
in a case that a first-stage sequence of the multiple stages of sequences do not carry the stage indication information, stage indication information carried by remaining stages of sequences; or,
stage indication information of one or more stages of sequences that is carried by an immediate next stage of sequence of the multiple stages of sequences.

Optionally, the stage indication information includes:
stage index information or group index information.

Optionally, the multiple stages of sequences further carry at least one of:
a BWP index, a carrier index, indication information of a quantity of to-be-skipped PDCCH monitoring periodicities, resource information of the power saving signal.

Optionally, the carrier index is a carrier index of at least one carrier index configured semi-statically at a network side; and/or,
the quantity of to-be-skipped PDCCH monitoring periodicities is a quantity of at least one quantity of to-be-skipped PDCCH monitoring periodicities configured semi-statically at the network side.

Optionally, the multiple stages of sequences are multiple stages of sequences not scrambled by a scrambling sequence, each stage of sequence of the multiple stages of sequences includes a gold sequence, and the power saving identifier, the power saving area identifier, and the stage indication information of the multiple stages of sequences are functions of initial phases of the gold sequences.

Optionally, the multiple stages of sequences are multiple stages of sequences scrambled with scrambling sequences, the scrambling sequences for the multiple stages of sequences carry the power saving area identifier and the stage indication information, and base sequences of the multiple stages of sequences carry the power saving identifier; or,
the multiple stages of sequences are multiple stages of sequences scrambled with scrambling sequences, the stage indication information of one or more stages of sequences is carried by the scrambling sequences for an immediate next stage of sequence of the multiple stages of sequences, and base sequences of the multiple stages of sequences carry the power saving identifier.

Optionally, in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
in the case that the stage indication information of one or more stages of sequences is carried by the scrambling sequences for the immediate next stage of sequence of the multiple stages of sequences, the scrambling sequences for respective stages of the multiple stages of sequences are different from each other.

Optionally, the multiple stages of sequences at least include a first-stage sequence and a second-stage sequence;
wherein the base sequences of the first-stage sequence and the base sequences of the second-stage sequence are of a same sequence type, and the sequence type is orthogonal sequence, gold sequence, ZC sequence or Kasami sequence; or,
the base sequences of the first-stage sequence are of a sequence type selected from orthogonal sequence, gold sequence, ZC sequence or Kasami sequence, and the base sequences of the second-stage sequence are of another sequence type selected from orthogonal sequence, gold sequence, ZC sequence or Kasami sequence.

Optionally, binary indication information composed of multiple kinds of power saving information carried by the power saving signal corresponds to sequence indexes of the multiple stages of sequences; wherein, the multiple kinds of power saving information at least include the power saving identifier, the power saving area identifier, and the stage indication information of the multiple stages of sequences;
and/or,
in a case that the multiple stages of sequences include a first-stage sequence and a second-stage sequence, the terminal does not monitor the second-stage sequence until the first-stage sequence is detected;
and/or,
each stage of sequence of the multiple stages of sequences has following characteristics:
one or more base sequences are summed;
the sum undergoes sub-carrier mapping, inverse fast Fourier transform (IFFT) and cyclic prefix (CP) addition, and is then mapped to corresponding transmission resources.

Optionally, different fields of the sequence indexes of the multiple stages of sequences correspond to different power saving information.

Optionally, the first-stage power saving signal carries power saving information that does not require blind-detection;
the second-stage power saving signal at least carries power saving information that is unpredictable in advance.

Optionally, the first-stage power saving signal is transmitted in a DRX OFF period, and the second-stage power saving signal is transmitted in the DRX OFF period or in a DRX on period;
and/or,
the first-stage power saving signal is single stage of sequence or multiple stages of sequences;
and/or,
the second-stage power saving signal is a PDCCH based power saving signal.

Optionally, a candidate position for transmitting the second-stage power saving signal in the DRX on period is configured semi-statically, or is agreed upon between the network device and the terminal in advance.

It is noted, the network device in this embodiment may be a network device of any implementation in the method embodiment of the embodiments of the present disclosure. Any implementation of the network device in the method embodiment of the embodiments of the present disclosure may be implemented by the network device in this embodiment and may achieve the same beneficial effects. A detailed description thereof is omitted.

An embodiment of the present disclosure further provides a computer readable storage medium storing therein a computer program, wherein the computer program is configured to be executed by a processor, to implement the steps of the power saving signal transmission method of the terminal side provided by the embodiment of the present disclosure, or implement the steps of the power saving signal transmission method of the network device side provided by the embodiment of the present disclosure.

In the several embodiments provided in this application, it should be understood that the disclosed method and device may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electrical, mechanical, or other forms.

In addition, various functional units in the embodiments of the present disclosure may be integrated into one processing unit, or each of the units may exist alone physically. Alternatively, two or more functional units may be integrated into one unit. The above integrated unit may be implemented in form of hardware, or may be implemented in form of a combination of hardware and software functional unit.

The integrated units implemented in form of software functional unit may be stored in a computer-readable storage medium. The software functional unit is stored in a storage medium, and includes several instructions for instructing a computer device (which may be a personal computer, a server, or a network device) to perform a part of the steps of the transmitting and receiving methods described in the embodiments of the present disclosure. The foregoing storage medium includes any medium that can store program code, such as a Universal Serial Bus (USB) flash drive, a removable hard disk, a Read-Only Memory (ROM), a Random Access Memory (RAM), a magnetic disk, or an optical disc.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A power saving signal transmission method, comprising:
   receiving, by a terminal, a power saving signal transmitted by a network device;
   wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; wherein the stage indication information includes: stage index information or group index information;
   wherein the stage indication information of the multiple stages of sequences comprises:
   the stage indication information carried by each stage of sequence of the multiple stages of sequences; or,
   in a case that a first-stage sequence of the multiple stages of sequences does not carry the stage indication information, the stage indication information carried by remaining stages of sequences; or,
   the stage indication information of one or more stages of sequences that is carried by an immediate next stage of sequence of the multiple stages of sequences,
   wherein the multiple stages of sequences further carry at least one carrier index configured semi-statically by the network device.

2. The power saving signal transmission method according to claim 1, wherein the multiple stages of sequences are the multiple stages of sequences not scrambled by a scrambling sequence, each stage of sequence of the multiple stages of sequences is a gold sequence, and the power saving identifier, the power saving area identifier, and the stage indication information of the multiple stages of sequences are functions of initial phases of the gold sequences;
   or,
   wherein the multiple stages of sequences are the multiple stages of sequences scrambled with scrambling sequences, the scrambling sequences for the multiple stages of sequences carry the power saving area identifier and the stage indication information, and base sequences of the multiple stages of sequences carry the power saving identifier; or,
   the multiple stages of sequences are the multiple stages of sequences scrambled with scrambling sequences, the stage indication information of one or more stages of sequences is carried by the scrambling sequences for an immediate next stage of sequence of the multiple stages of sequences, and the base sequences of the multiple stages of sequences carry the power saving identifier.

3. The power saving signal transmission method according to claim 2, wherein in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
   in the case that the stage indication information of one or more stages of sequences is carried by the scrambling sequences for the immediate next stage of sequence of the multiple stages of sequences, the scrambling sequences for respective stages of the multiple stages of sequences are different from each other.

4. The power saving signal transmission method according to claim 1, wherein,
   binary indication information composed of multiple kinds of power saving information carried by the power saving signal corresponds to sequence indexes of the multiple stages of sequences; wherein, the multiple kinds of power saving information at least comprise the power saving identifier, the power saving area identifier, and the stage indication information of the multiple stages of sequences;
   and/or,
   in a case that the multiple stages of sequences comprise a first-stage sequence and a second-stage sequence, the terminal does not monitor the second-stage sequence until the first- stage sequence is detected;
   and/or,
   each stage of sequence of the multiple stages of sequences has following characteristics:
   one or more base sequences are summed;
   the summed base sequences undergoes sub-carrier mapping, inverse fast Fourier transform (IFFT) and cyclic prefix (CP) addition, and is then mapped to corresponding transmission resources.

5. The power saving signal transmission method according to claim 4, wherein,
different fields of the sequence indexes of the multiple stages of sequences correspond to different power saving information.

6. A power saving signal transmission method, comprising:
transmitting, by a network device, a power saving signal to a terminal;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; wherein the stage indication information includes: stage index information or group index information;
wherein the stage indication information of the multiple stages of sequences comprises:
the stage indication information carried by each stage of sequence of the multiple stages of sequences; or,
in a case that a first-stage sequence of the multiple stages of sequences does not carry the stage indication information, the stage indication information carried by remaining stages of sequences; or,
the stage indication information of one or more stages of sequences that is carried by an immediate next stage of sequence of the multiple stages of sequences,
wherein the multiple stages of sequences further carry at least one carrier index configured semi-statically by the network device.

7. The power saving signal transmission method according to claim 6, wherein the multiple stages of sequences are the multiple stages of sequences not scrambled by a scrambling sequence, each stage of sequence of the multiple stages of sequences is a gold sequence, and the power saving identifier, the power saving area identifier, and the stage indication information of the multiple stages of sequences are functions of initial phases of the gold sequences; or,
wherein the multiple stages of sequences are the multiple stages of sequences scrambled with scrambling sequences, the scrambling sequences for the multiple stages of sequences carry the power saving area identifier and the stage indication information, and base sequences of the multiple stages of sequences carry the power saving identifier; or,
the multiple stages of sequences are the multiple stages of sequences scrambled with scrambling sequences, the stage indication information of one or more stages of sequences is carried by the scrambling sequences for an immediate next stage of sequence of the multiple stages of sequences, and the base sequences of the multiple stages of sequences carry the power saving identifier.

8. The power saving signal transmission method according to claim 7, wherein in the case that the scrambling sequences for the multiple stages of sequences carry the power saving area identifier and the stage indication information, the scrambling sequences for respective stages of the multiple stages of sequences are different from each other, and the scrambling sequences for multiple sequences of a same stage are identical; or,
in the case that the stage indication information of one or more stages of sequences is carried by the scrambling sequences for the immediate next stage of sequence of the multiple stages of sequences, the scrambling sequences for respective stages of the multiple stages of sequences are different from each other.

9. The power saving signal transmission method according to claim 6, wherein,
binary indication information composed of multiple kinds of power saving information carried by the power saving signal corresponds to sequence indexes of the multiple stages of sequences; wherein, the multiple kinds of power saving information at least comprise the power saving identifier, the power saving area identifier, and the stage indication information of the multiple stages of sequences;
and/or,
in a case that the multiple stages of sequences comprise a first-stage sequence and a second-stage sequence, the terminal does not monitor the second-stage sequence until the first- stage sequence is detected;
and/or,
each stage of sequence of the multiple stages of sequences has following characteristics:
one or more base sequences are summed;
the summed base sequences undergoes sub-carrier mapping, inverse fast Fourier transform (IFFT) and cyclic prefix (CP) addition, and is then mapped to corresponding transmission resources.

10. A network device for implementing the method according to claim 6, comprising a transceiver, a memory, a processor and a program stored in the memory and configured to be executed by the processor, wherein
the transceiver is configured to transmit a power saving signal to a terminal;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier
wherein the stage indication information of the multiple stages of sequences comprises:
the stage indication information carried by each stage of sequence of the multiple stages of sequences; or,
in a case that a first-stage sequence of the multiple stages of sequences does not carry the stage indication information, the stage indication information carried by remaining stages of sequences; or,
the stage indication information of one or more stages of sequences that is carried by an immediate next stage of sequence of the multiple stages of sequences,
wherein the multiple stages of sequences further carry at least one carrier index configured semi-statically by the network device.

11. A terminal, comprising a transceiver, a memory, a processor and a program stored in the memory and configured to be executed by the processor, wherein
the transceiver is configured to receive a power saving signal transmitted by a network device;
wherein the power saving signal is multiple stages of sequences, the multiple stages of sequences at least carry a power saving identifier, a power saving area identifier, and stage indication information of the multiple stages of sequences, the power saving identifier corresponds to a terminal to be woken up in a power saving area, and the power saving area is an area indicated by the power saving area identifier; wherein the stage indication information includes: stage index information or group index information;

wherein the stage indication information of the multiple stages of sequences comprises:

the stage indication information carried by each stage of sequence of the multiple stages of sequences; or, in a case that a first-stage sequence of the multiple stages of sequences does not carry the stage indication information, the stage indication information carried by remaining stages of sequences; or, the stage indication information of one or more stages of sequences that is carried by an immediate next stage of sequence of the multiple stages of sequences, wherein the multiple stages of sequences further carry at least one carrier index configured semi-statically by the network device.

* * * * *